Nov. 22, 1927.  1,650,408
P. Q. WILLIAMS
CONVEYING MECHANISM
Original Filed Nov. 21, 1921    3 Sheets-Sheet 1
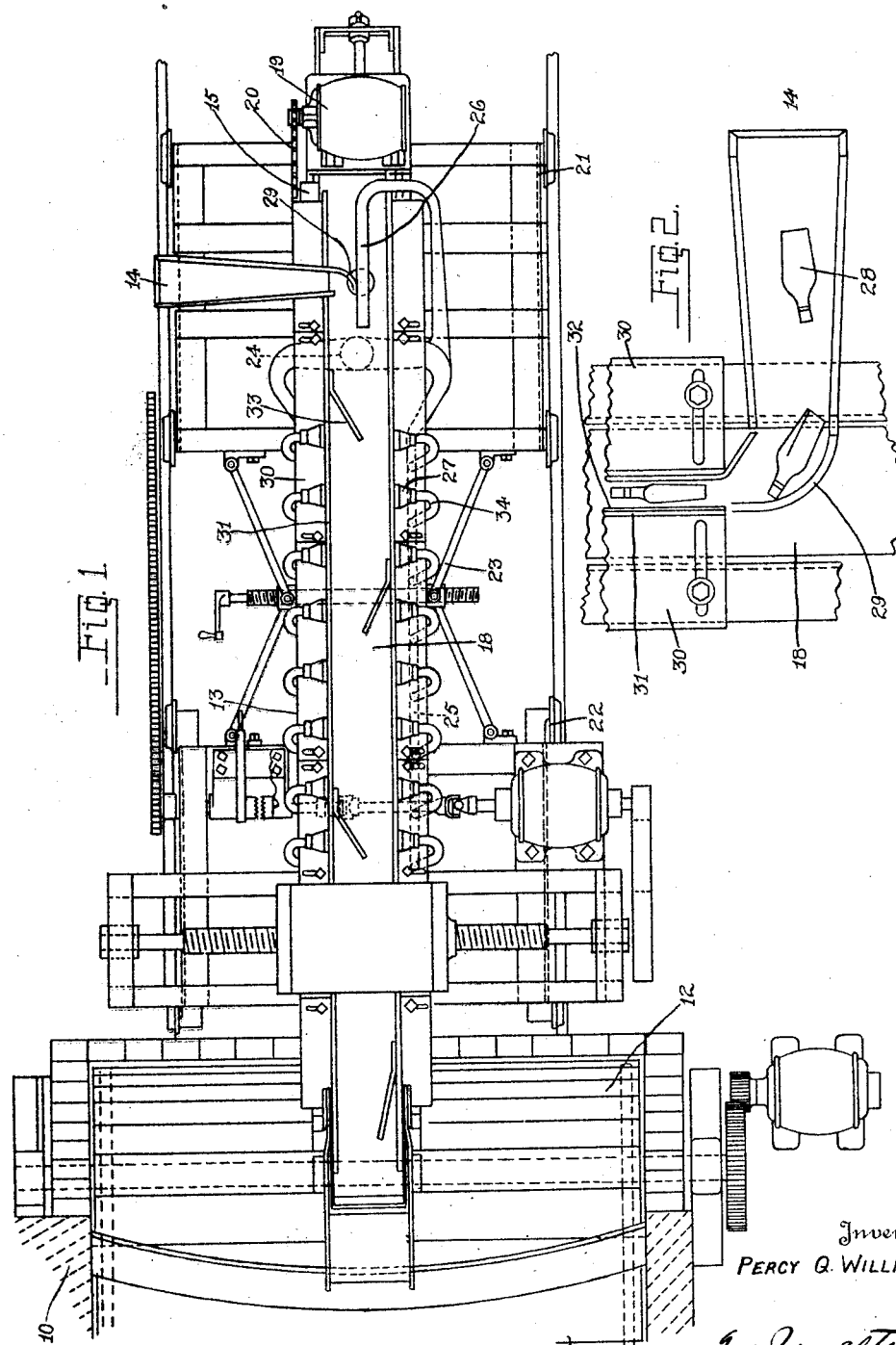
Inventor
PERCY Q. WILLIAMS.

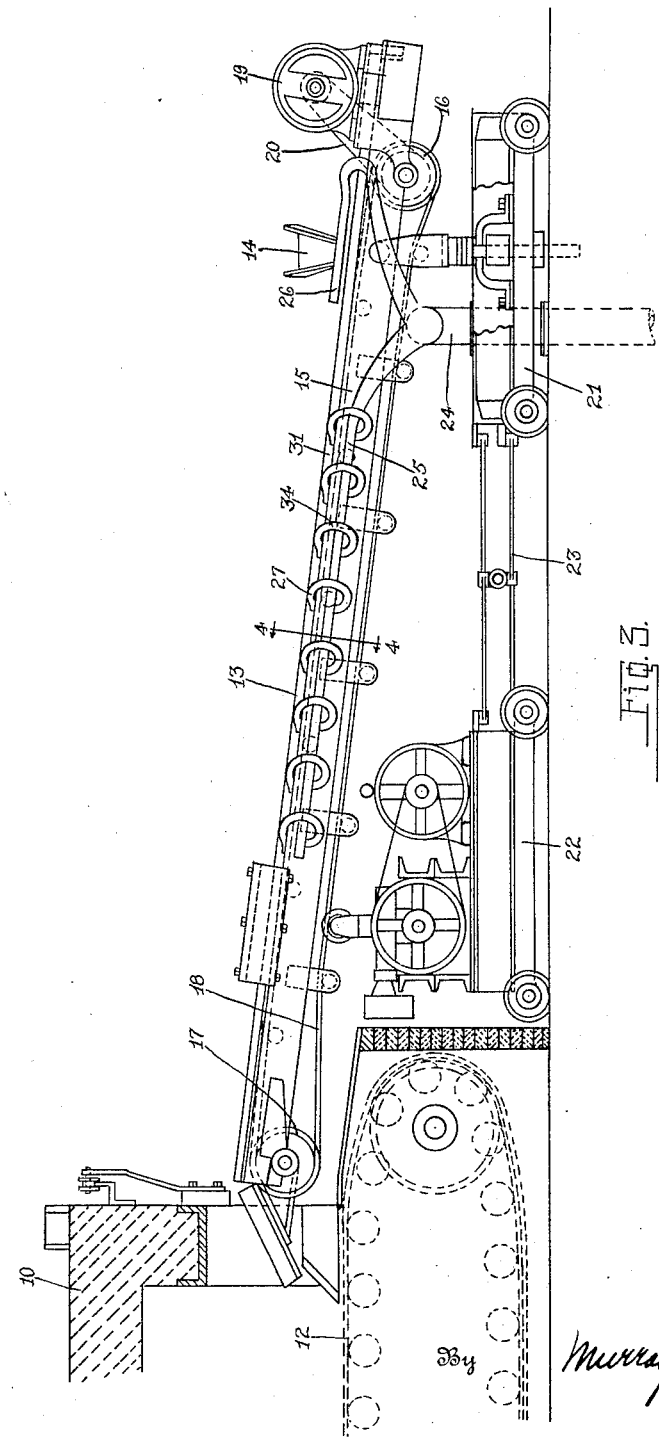

Nov. 22, 1927.

P. Q. WILLIAMS 1,650,408

CONVEYING MECHANISM

Original Filed Nov. 21, 1921   3 Sheets-Sheet 3

Inventor
PERCY Q. WILLIAMS.

By Murray & Gugelter
Attorneys

Patented Nov. 22, 1927.

1,650,408

UNITED STATES PATENT OFFICE.

PERCY Q. WILLIAMS, OF CINCINNATI, OHIO.

CONVEYING MECHANISM.

Original application filed November 21, 1921, Serial No. 516,518, Patent No. 1,487,000. Divided and this application filed February 27, 1924. Serial No. 695,557.

This is a divisional application upon the subject matter disclosed in my Letters Patent No. 1,487,000, of March 18, 1924.

This application is concerned with those portions of the said parent application relating to the means for depositing panel ware upon one of its smaller edges.

In this divisional application is shown means for deflecting ware as it is moved by a conveyor forming a detail of my invention.

In the accompanying drawings, Fig. 1 is a plan view of an apparatus constructed in accordance with my invention.

Fig. 2 is a fragmentary plan view showing means for directing bottles onto the conveyor and turning them up on their narrow sides or edges.

Fig. 3 is a side elevation of the device shown in Fig. 1.

Figure 7:
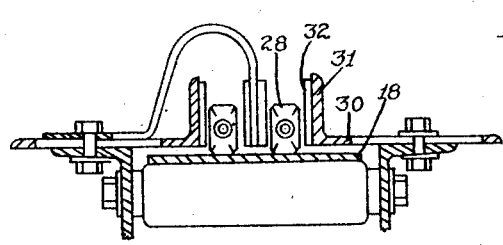

Fig. 7. is a fragmentary view showing a conveyor with a central guide providing two channels for the bottles or other ware.

The leer 10 contains a leer conveyor 12 that receives ware from a transfer conveyor 13. The transfer conveyor 13 receives ware from a bottle machine, not shown, the ware moving to the conveyor 13 over an inclined chute 14 as the ware is discharged from the bottle machine.

The conveyor 13 comprises a frame 15 having drums 16 and 17 at its opposite ends and about which drums a suitable endless belt 18 extends. Movement of the drums and of the belt may be effected in any suitable manner such as by means of a motor 19 carried by the frame and driving the drum 16 by a suitable sprocket and chain drive mechanism 20. The frame 15 is supported in any suitable manner, for example upon trucks 21 and 22 connected by a suitable toggle structure 23. The forward or receiving end of the frame 15 has a pivotal mounting upon a tubular structure or pipe 24 through which cooling air may be transmitted to pipes 25 extending longitudinally of the frame 15, at both sides thereof and to pipe 26 extending longitudinally of the frame 15 adjacent the receiving end of the frame. The cooling air emitted from the pipe 26 moves longitudinally of the conveyor 13 and the cooling air emitted from the pipes 25 by way of suitable discharge nozzles or blowing heads 27, moves transversely of the conveyor 13. The discharge end of the conveyor 13 is oscillated about the axis of the pipe or tube 24. The structure for accomplishing said action is fully disclosed in the parent application, and whereas no claim is made therefor in this divisional application, no further explanation thereof is deemed necessary. The bottles 28, or other glass articles, are delivered to the inclined chute 14, down which they slide by gravity, neck end first, onto the conveyor. At the lower end of the chute is a curved wall 29 (Fig. 2) by which the bottles are guided and turned to extend in the direction of the conveyor. Panel bottles of greater width than thickness, such as shown in the drawings, are automatically turned up on edge or up on their narrow sides as they pass from the chute 14 on to the conveyor. That is to say, the bottles as they move along the curved wall 29 have their edges, which are farthest from the wall, thrown upward.

Figure 6:
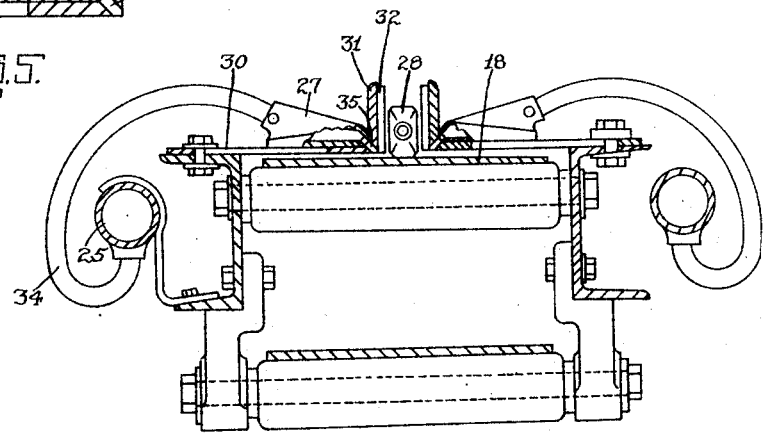
Fig. 6 is a cross section at line 4—4 of Fig. 3, the side walls being adjusted to form a narrow channel for the bottles.

This is apparently due to the combined action of momentum and the movement of the conveyor. The frame 15 of the conveyor 13 carries side walls 30 having vertical flanges or angle bars 31 extending longitudinally of the conveyor or belt 18 thereby providing a channel over the belt 18 through which the ware may be carried. Said side walls may be adjusted to the Fig. 6 position, thereby providing a comparatively narrow channel along which the bottles are conveyed in single file, said walls preventing the bottles from tipping over.

This arrangement for turning the bottles up on their narrow sides or edges and maintaining them in such position is a feature of practical importance. The bottles when discharged on the conveyor are sometimes sufficiently hot and plastic to permit the upper side of the bottle to sag downward under its weight, thereby distorting the bottle and reducing its capacity. This is particularly the case when panel ware lies upon one of its larger panels, whereupon the wide uppermost panel of the bottle will sag inwardly. By turning the bottles on edge, such distortion is prevented in that the small upper panel contains a very slight mass of glass and the side walls or large panels being rather close together, the said upper small panel is substantially supported against sagging.

The side walls 30 may be provided with a facing of asbestos 32. The belt 18 may have an asbestos face.

Figure 4:
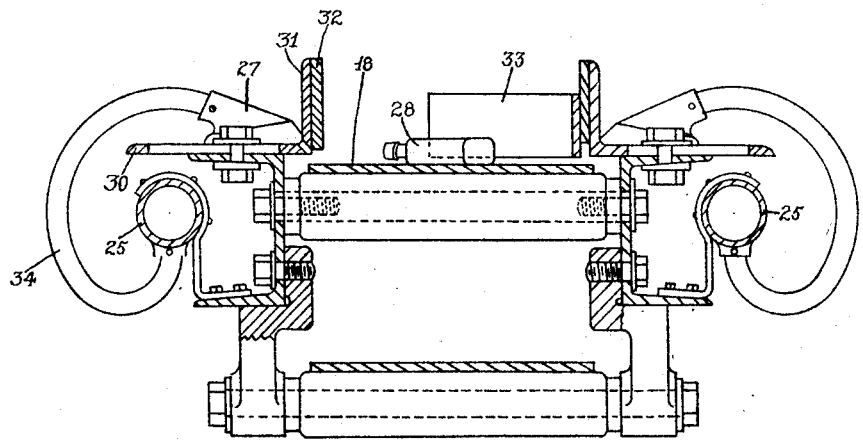
Fig. 4 is an enlarged sectional view on line 4—4 of Fig. 3.
Figure 5:
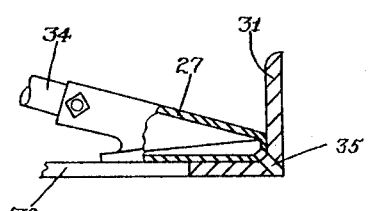
Fig. 5 is a detail showing a blowing head or nozzle from which air is directed onto the articles on the conveyor.

With many kinds of ware it is desirable to adjust the side walls a considerable distance apart, as indicated in Fig. 4. To prevent the bottles from sticking to the conveyor, or remaining too long in one position on the conveyor, baffle plates or deflectors 33 may be arranged at intervals along the conveyor walls. By reference to Fig. 1 it will be evident that the baffle plates or deflectors are preferably arranged in staggered relation so that ware will be moved alternately between the side walls of the way through which the ware is carried. In my co-pending application, Serial No. 565,732, I disclose means for moving round ware transversely of the conveyor. Round ware can be rolled as distinguished from the panel ware disclosed herein. Some panel ware is of such nature that it is advisable not to move it laterally of the conveyor belt, however, other ware is of such nature that it should be moved laterally of the conveyor belt to avoid sticking of the ware to the belt and to avoid various other undesirable possibilities.

Fig. 7 illustrates an arrangement by which a number of parallel channels are provided, through which channels the ware may be carried by the belt 18.

Referring to Fig. 4, and the cooling system, it will be observed that the pipes 25, extending longitudinally of the frame are provided with laterally extending tubes or pipes 34 through which air is supplied to the blowing heads or nozzles 27. The air from these heads or nozzles is directed through perforations 35 against the articles on the conveyor.

What I claim is:

1. The combination of a moving conveyor, support means extending in the direction of movement of the conveyor and forming with said conveyor a way through which ware may be moved by the conveyor, and a fixed channel along which articles are directed to the conveyor, said channel shaped to automatically turn flat ware from a flat position to an edgewise position during its passage along the channel and deliver it in edgewise position to said way, said support means being adapted to receive and support the ware on edge.

2. A positioning device for bottles having a plurality of unequal side faces, comprising an inclined chute over which the bottles move under the influence of gravity, and an automatic means for turning those bottles supported upon a larger side face for supporting said bottles upon a smaller side face thereof, said means being ineffective for turning bottles presented to said automatic means while supported on said smaller face.

3. The combination with a conveyor of means for positioning a bottle having a bottom and unequal side panels, said means comprising an inclined chute over which such bottles may move under the influence of gravity, and automatic means for turning those bottles about their longitudinal axis that have their larger faces supporting same upon the inclined chute whereby to support said bottles upon a smaller face, and delivering the bottles to the conveyor in such position.

4. A bottle positioning device comprising an inclined chute, a conveyor moving adjacent the lower end of the chute in a direction substantially at right angles to the length of the chute, and a curved wall carried by the lower end of the chute, the said wall having a free end extending transversely of said chute and in the direction of movement of the conveyor.

5. A bottle positioning device comprising an inclined chute, a traveling conveyor moving adjacent the lower end of the chute and a wall extending over the conveyor at an angle to the chute for contact by bottles moving from the chute to the conveyor whereby the joint movement of the bottles over the chute and the engagement of the bottles upon the moving conveyor and upon the wall will rotate the bottles on their major axis.

6. In a device of the class described, the combination of a conveyor, side walls extending lengthwise of the conveyor and forming with the conveyor a way through which articles may be carried by the conveyor, and a series of deflectors carried alternately by the side walls and extending into said way, said deflectors being arranged to deflect the articles and cause them to travel in a zigzag path as they advance with the conveyor.

7. The combination of an endless traveling conveyor, and a channel through which panel bottles travel to the conveyor, said channel mounted in fixed position with the floor thereof at its delivery end at about the level of and close to the conveyor for delivering panel bottles to the conveyor, said channel shaped to deliver panel bottles in an edgewise position to the conveyor with the bottles extending lengthwise of the conveyor, and means co-operating with the conveyor to support the bottles on their narrow sides or edges as they are carried along the conveyor.

8. The combination of an endless traveling conveyor, an inclined chute extending in a direction transverse to the conveyor and down which flat sided bottles are delivered endwise to the conveyor, an automatic means for turning the bottles from the direction of the chute to the direction of the conveyor as they pass onto the latter.

9. The combination of an endless traveling conveyor, an inclined chute extending in a direction transverse to the conveyor and down which flat sided bottles are delivered endwise to the conveyor, and automatic means to change the direction of said bottles to that of the conveyor as they pass onto the latter and to simultaneously rotate the bottles about their longitudinal axes so that they are supported on a different side while on the conveyor from that on which they are supported while on the chute.

In testimony whereof, I have hereunto subscribed my name this 20th day of February, 1924.

PERCY Q. WILLIAMS.